US011257494B1

(12) United States Patent
Zhong et al.

(10) Patent No.: US 11,257,494 B1
(45) Date of Patent: Feb. 22, 2022

(54) INTERACTING WITH A VIRTUAL ASSISTANT TO COORDINATE AND PERFORM ACTIONS

(71) Applicant: Amazon Technologies, Inc., Seattle, WA (US)

(72) Inventors: Gary Zhong, Milpitas, CA (US); Jonathan Alan Leblang, Menlo Park, CA (US); Aakarsh Nair, Lynnwood, CA (US); Collin Charles Davis, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 206 days.

(21) Appl. No.: 16/561,888

(22) Filed: Sep. 5, 2019

(51) Int. Cl.
*G10L 15/22* (2006.01)
*G06N 20/00* (2019.01)
*G10L 15/18* (2013.01)
*G06N 5/04* (2006.01)

(52) U.S. Cl.
CPC .............. *G10L 15/22* (2013.01); *G06N 5/04* (2013.01); *G06N 20/00* (2019.01); *G10L 15/1815* (2013.01); *G10L 2015/223* (2013.01)

(58) Field of Classification Search
CPC ... G10L 15/22; G10L 15/26; G10L 2015/088; G10L 15/07; G10L 15/08; G10L 15/1815; G10L 2015/225; G10L 2025/783; G10L 25/78; G10L 25/87; G06F 16/252; G06F 26/29; G06F 26/34; G06F 3/167; G06F 9/542; G06F 16/00; G06F 16/3349; G06F 3/0488; G06F 3/16; G06F 3/165; G06F 40/30; G06Q 10/109; G06Q 10/06; G06Q 10/1095; G06Q 50/30; G06N 5/02; G06N 5/04
USPC ..... 704/270, 270.1, 275, 251; 701/465, 533; 705/26.64, 7.19; 707/999.003, 999.101, 707/206
See application file for complete search history.

(56) References Cited

U.S. PATENT DOCUMENTS

| | | | |
|---|---|---|---|
| 9,037,405 B2* | 5/2015 | Gourlay | G08G 1/096811 701/465 |
| 9,171,251 B2* | 10/2015 | Camp | G05B 13/00 |
| 9,830,126 B2* | 11/2017 | Alders | G06N 5/04 |
| 10,664,328 B2* | 5/2020 | Breijo Baullosa | G06F 9/542 |
| 2008/0235018 A1* | 9/2008 | Eggen | G10L 15/26 704/251 |

(Continued)

*Primary Examiner* — Vijay B Chawan
(74) *Attorney, Agent, or Firm* — Lee & Hayes, P.C.

(57) ABSTRACT

Technologies are disclosed for interacting with a virtual assistant to coordinate, recommend and perform actions. According to some examples, a user may use their voice to interact with a virtual assistant to receive recommendations relating to determining when to perform one or more actions. For example, a user may interact with a virtual assistant to request a recommendation as to when they should leave for the office, leave the office for the day, perform a task, and the like. The recommendation system accesses selected data sources (e.g., calendars, task lists, traffic, transportation schedules, maps, . . . ) to obtain data used in generating the recommendation. In addition, to providing a recommended time, the virtual assistant may also recommend actions to perform. The virtual assistant may also provide notifications to one or more other users that includes information relating to the user leaving.

20 Claims, 9 Drawing Sheets

(56) References Cited

U.S. PATENT DOCUMENTS

| | | | | |
|---|---|---|---|---|
| 2009/0307089 A1* | 12/2009 | Binnewies | .......... | G06Q 30/0257 |
| | | | | 705/14.55 |
| 2011/0106892 A1* | 5/2011 | Nelson | ................. | G06Q 10/109 |
| | | | | 709/206 |
| 2011/0161001 A1* | 6/2011 | Fink | ................... | G01C 21/3407 |
| | | | | 701/533 |
| 2015/0095198 A1* | 4/2015 | Eramian | ............ | G06Q 30/0629 |
| | | | | 705/26.64 |
| 2016/0148164 A1* | 5/2016 | Luk | ................... | G06Q 10/1095 |
| | | | | 705/7.19 |
| 2018/0188695 A1* | 7/2018 | Kumar | ................... | G04G 13/02 |
| 2019/0003849 A1* | 1/2019 | Pahwa | ............... | G01C 21/3608 |
| 2019/0295544 A1* | 9/2019 | Garcia | .................... | G06F 40/30 |
| 2019/0361754 A1* | 11/2019 | Breijo Baullosa | ...... | G06F 9/542 |
| 2020/0184956 A1* | 6/2020 | Agarwal | ................. | G06F 3/167 |

\* cited by examiner

INTERACTING WITH A VIRTUAL ASSISTANT TO COORDINATE AND PERFORM ACTIONS

BACKGROUND

Today, users can interact with voice-controlled devices to perform a variety of tasks. For example, a user may request the voice-controlled device to turn on/off lights, adjust the temperature of a room, answer questions, play music, order food, and the like. Some of these voice-controlled devices may be known as virtual assistants. Virtual assistants are configured to respond to different commands said by a user. Users are able to interact with virtual assistants to make calls, send messages, answer questions, provide directions, open applications, create to-do lists, set appointments on calendars, provide upcoming tasks and/or appointments, read the news, provide weather information, check the traffic, as well as perform many other tasks.

While virtual assistants allow users to perform a large variety of tasks, the capabilities of virtual assistants are limited to specific predefined actions. For example, if a user wants to determine the weather for the day, find out the current traffic, and send a message, the user utters three different voice commands and/or creates a routine that includes these different commands.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
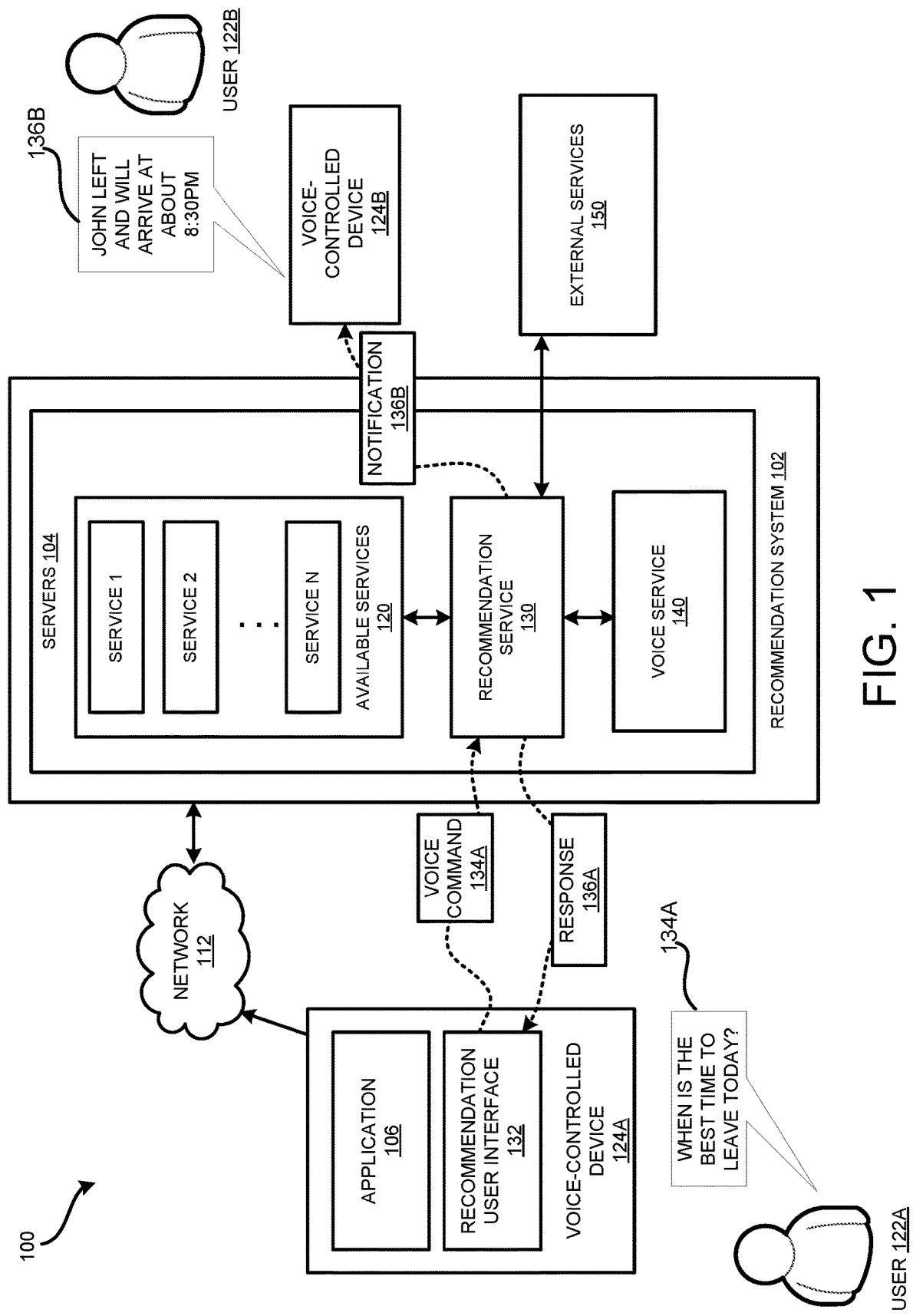
FIG. 1 is a software and network architecture diagram showing aspects of the configuration and utilization of a recommendation system for interacting with a virtual assistant to coordinate, recommend and perform actions.

The following detailed description is directed to technologies for interacting with a virtual assistant to coordinate, recommend, and perform actions. According to some examples, a user may use their voice to interact with a virtual assistant to receive recommendations relating to determining when to perform one or more actions. For example, a user may interact with a virtual assistant to request a recommendation as to when they should leave to go to the office, leave the office for the day, perform a task (e.g., when to run an errand), and the like.

Instead of basing the recommendation on a desired time to perform the action (e.g., a desired arrival time at a destination), the recommended time can be based on maximizing (or attempting to maximize or at least increasing) productivity time for the user. As used herein "productivity time" refers to the time available for a user to perform tasks or work within a given amount of time (e.g., a day, a work day, or some other time frame). The more productivity time a user has, the more productive that user may be. For example, instead of recommending a time to leave home to travel to work such that the user gets to work at a particular time, the recommendation is based on maximizing the productivity time for the user. In this way, the user has more available time to complete the tasks of the day.

Prior to the technologies described herein, a user may spend a large amount of time and resources determining when to perform an action. For instance, a user may spend a lot of time determining the best time to leave the office to arrive at a destination at or prior to a particular time, to determine the shortest commute home, to avoid traffic, etc. As an illustrative example, imagine that throughout the day, a user spends time planning their commute back home. To determine the best time to leave to go home, the user checks many different sources of information. For instance, the user may check traffic conditions on a traffic website, public transportation schedules (e.g., bus, subway, train, company shuttles) from different websites, weather from another website, and the like.

The user then checks a work calendar to determine whether there are any meetings that may interfere with the commute home. For example, the user may determine to leave earlier or later than originally planned to accommodate an upcoming meeting. The user may also check a home calendar, or other calendars to determine if there are any other activities to be aware of. The user may also check a to-do list to determine if there are any tasks to be performed before leaving. For example, the user may need to print out a document, and drop the document off for delivery to another user.

The user may also determine whether there are any errands to perform on the way home. For example, the user may have errands to pick up groceries, pick up kids from day care, and the like. The user may perform these checks multiple times throughout the day. When the user decides to leave for the day, the user may send a message to tell a family member that they are on their way home along with an estimated time of arrival.

Using technologies described herein, instead of wasting time and resources manually checking a variety of different sources at different times throughout the day, a recommendation system may automatically check different sources, obtain data from the different sources, and use the data obtained from the different sources to generate recommendations and perform actions that assist the user. For instance, in the example described above, the recommendation system may automatically check the different sources selected by the user (and possibly other sources when authorized), determine a best time to leave based on the data obtained from the various sources, and provide the time to leave to the user. As discussed above, the best time to leave may be based on the time to leave that maximizes, or at least increases, the productivity time for the user. The virtual assistant may also remind the user of the pending tasks to be completed, provide the best option for the user to travel back home, and provide notifications to one or more other users of an expected arrival time (and possibly other information).

As such, according to techniques describe herein, the user may ask a virtual assistant the best time to leave and/or when is the best time to perform some other action. For instance, the user may ask the virtual assistant "Can I go home now?", "When should I leave work today?", "Should I wait to go to work?", and the like. The virtual assistant accesses the different sources that are relevant to the requests, generates a time to leave, provides the suggested time to the user, the pending tasks, and may indicate the best transportation option(s) for the commute.

In some cases, the recommendation system may detect changes to one or more of the data sources (e.g., a meeting is added/removed, a task is added/removed, traffic conditions change, weather condition changes, and the like). If the virtual assistant determines that the changes affect the recommended time to leave, the recommendation system may provide an updated recommendation to the user. For example, a meeting may have been added that affects when the user should leave for the day. The virtual assistant may also provide a notification to one or more other users that includes information relating to the user leaving. For example, the recommendation system may determine that the user has left the building (e.g., based on an indication by the user, using GPS or some other location-based service or technology, or the like) and automatically send an electronic message (e.g., an SMS, email, and the like) to one or more users.

According to some configurations, the user may select the different sources for the virtual assistant to access and utilize when generating the recommendations and performing actions. The sources may include many different types of sources. The data sources utilized by the recommendation system may include but are not limited to traffic information (e.g. from Online Map Services (ex. Google Maps®), public bus schedule services (ex. CityMapper® or Google Maps®), company shuttle service providers, work calendars, personal calendars, work to-do lists, personal to-do lists, custom data services (e.g., provided by the user's company), and the like.

In some examples, the recommendation system uses different services that may be provided by a service provider associated with the virtual assistant, or services provided by other entities. For instance, the recommendation system may utilize a recommendation service, a voice service, a reminder/alarm service, a messaging service, a traffic service, a mapping service, a to-do list service, a calendar service, and the like.

Generally, the recommendation service is configured to access the different data sources (e.g., services, websites, data stores, . . . ) selected by the user, or some other authorized entity or user, and obtain data from the selected data sources that relate to generating the recommendation. For example, the recommendation service may recommend the best time to leave, the best route to take, the best mode of transportation (e.g., car, bus, train, taxi, ferry, . . . ) based on the data obtained from the different sources. As discussed above, the recommendation service may automatically update a recommendation based on detected changes to the data. If the user asks the virtual assistant "Can I leave now?", and the current time is not the best time to leave, the recommendation service may offer to set a reminder for the recommended time. The recommendation service may then utilize an alarm service, and/or some other component or service to configure the reminder for the user.

According to some configurations, the recommendation service may access one or more services for planning routines associated with the user. For example, the recommendation service may determine the best time for the user to wake up in the morning to leave at the recommended time. In some configurations, the recommendation service can be used to trigger one or more services (e.g., in the middle of the night) to plan the morning commute of the user. The recommended time may be used when setting the wake-up alarm (e.g., one hour before the user is to leave the house).

According to some examples, the recommendation service may utilize one or more machine learning mechanisms when generating the recommendations. Additional details regarding the various components and processes described briefly above for interacting with a virtual assistant to coordinate, recommend and perform actions will be presented below with regard to FIGS. 1-9.

It should be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. The configurations described herein can also be practiced in distributed computing environments, where tasks can be performed by remote computing devices that are linked through a communications network. In a distributed computing environment, program modules can be located in both local and remote storage devices.

In the following detailed description, references are made to the accompanying drawings that form a part hereof, and that show, by way of illustration, specific configurations or examples. The drawings herein are not drawn to scale. Like numerals represent like elements throughout the several figures (which might be referred to herein as a "FIG." or "FIGS.").

FIG. 1 is a software and network architecture diagram 100 showing aspects of the configuration and utilization of a recommendation system 102 for interacting with a virtual assistant to coordinate, recommend, and perform actions. It is to be appreciated that the environment 100 is merely illustrative and that the various configurations disclosed herein can be utilized in many different types of computing environments.

To provide the recommendation service 130 and the other functionality disclosed herein, the recommendation system 102 may include one or more servers 104. The servers 104 can execute software components to provide the services described herein, including recommendation functionality using a virtual assistant and different services provided by a service provider and/or some other entity. The software components can execute on a single server 104 or in parallel across multiple servers in the recommendation system 102. In addition, a software component can consist of subcomponents executing on different servers 104 or other computing devices in the recommendation system 102. Various components can be implemented as software, hardware, or any combination of the two. In this regard, it is to be appreciated that the recommendation system 102 shown in FIG. 1 has been simplified for discussion purposes and that many additional software and hardware components can be utilized.

A user 122A of the recommendation system 102 can utilize a virtual assistant, via a voice-controlled device 124A or some other input device, to access the recommendation system 102 through a network 112. Generally, a "virtual assistant" as used herein refers to software and/or hardware that receives input from a user and completes tasks for the user. As described herein, the virtual assistant is configured to understand natural language voice commands and complete tasks for the user, such as receiving/providing recommendation information. The user 122A can be an individual that desires to receive recommendations and have actions performed that are associated with the recommendation system 102. In some examples, the user 122 is a customer of the service provider.

The voice-controlled device 124A is an input device configured to receive voice queries/commands/utterances (which may collectively be referred to herein as "voice commands") from the user and provide data to a virtual assistant that may generate recommendations. The voice-controlled device 124 may include one or more microphones for generating audio signals that represent or are otherwise associated with sound from an environment 100, including voice utterances of a user.

The voice-controlled device 124 may be one or more devices, such as but not limited to a smart phone, a smart watch, a personal computer ("PC"), desktop workstation, laptop computer, tablet computer, notebook computer, personal digital assistants ("PDA"), electronic-book reader, game console, set-top box, consumer electronics device, server computer, or any other type of computing device capable of connecting to the network 112 and communicating with the recommendation system 102. In other configurations, the voice-controlled device 124 may be configured to communicate with one or more other devices to receive voice commands from users and/or perform processing related to functionality of the recommendation system.

In some configurations, the voice-controlled device 124 may be configured to perform automatic speech recognition (ASR) on the audio signals to identify voice commands therein or may be configured to provide the audio signals to another device (e.g., a remote service such as recommendation system 102) for performing the ASR on the audio signals for identifying the voice commands. As used herein, performing ASR on an audio signal to identify a voice command may include translating speech represented in the audio signal into text and analyzing the text to identify the voice command. Analysis of the text may be performed, locally by the voice-controlled device 124 and/or remotely by the one or more servers 104 (or other remote services), using natural language processing (NLP) and/or natural language understanding (NLU) techniques in order to determine an intent associated with the voice command. In other examples, ASR and/or NLP and/or NLU may be performed by a different computing system and/or service.

Within FIG. 1, the user 122A may interact with the voice-controlled device 124A within the environment 100 by using voice commands. For instance, if the user 122 would like to determine the best time to leave from home, work, or some other location, the user 123 may issue a voice command 134A (e.g., "When is the best time to leave work today?") to the voice-controlled device 124. Many other voice commands 134 can be utilized to interact with the recommendation system 102, such as "Can I leave now?", "Should I leave in 30 minutes?", "Please add my children to the notifications associated with my departure", and the like. In each example, the voice-controlled device 124 may interact with one or more remote services, discussed below, to generate the recommendations and perform actions.

As briefly discussed above, according to some configurations, the recommendation system 102 determines a time to perform an action, not based on a desired time (e.g., the user does not indicate a desired arrival time to arrive at a desired location), but on attempting to increase or maximize productivity time for the user. For example, the recommendation system 102 may recommend leaving earlier or later in the day, such that traffic is avoided, and/or the user can perform one or more other tasks that might not have been able to be completed. In this way, the user has more available time to complete the tasks of the day.

As illustrated, the voice-controlled device 124 may couple with a recommendation service 102 over a network 112. The network 112 may represent an array or wired networks, wireless networks (e.g., WiFi), or combinations thereof. The recommendation service 102 may generally refer to a network-accessible platform implemented as a computing infrastructure of processors, storage, software, data access, and so forth that is maintained and accessible via the network 112, such as the Internet. These services may not require end-user knowledge of the physical location and configuration of the system that delivers the services. Common expressions associated with these remote services, such as the recommendation service 102, include "on-demand computing", "software as a service (SaaS)", "platform computing", "network accessible platform", and so forth.

As illustrated, the recommendation system 102 may comprise one or more network-accessible resources, such as servers 104. These resources comprise one or more processors and computer-readable storage media executable on the processors. In some configurations, the user 122A may be authenticated before interacting with the recommendation service 102. In some examples, the voice-controlled device 124A is awakened upon identifying a predefined wake word. After being awakened, the voice-controlled device 124A may upload an audio signal representing sound captured in the environment 100 to the recommendation system 102 over the network 112. In response to receiving this audio signal, the voice service 140 may perform ASR, NLU, and/or NLP on the audio signal to identify one or more user voice commands therein. For instance, in the illustrated example, the voice service 140 may identify the user inquiring when is a good time to leave work, when is a good time to leave for work, when is a good time to perform another task (e.g., pick up the dry-cleaning, groceries, etc).

The network 112 can be a local-area network ("LAN"), a wide-area network ("WAN"), the Internet, or any other networking topology known in the art that connects the user devices to the recommendation system 102. The user 122A can use an application 106 executing on voice-controlled device 124A to access and utilize the recommendation service functionality provided by the servers 104. In some examples, the application 106 is a web browser application, such as the Amazon® Silk® web browser, or some other web browser. Generally, a web browser application exchanges data with the servers 104 in the recommendation system 102 using the hypertext transfer protocol ("HTTP") over the network 112.

The application might also be a stand-alone client application 106 configured for communicating with the servers 104. The client application 106 can also utilize any number of communication methods known in the art to communicate with the recommendation system 102 and/or the servers 104 across the network 112, including remote procedure calls, SOAP-based web services, remote file access, proprietary client-server architectures, and the like. According to some configurations, the application 106 provides a recommendation user interface 132 that can be utilized by the user 122A to select the services to utilize, to enter a voice command 134 that includes one or more terms used to generate recommendations. The recommendation user interface 132 may also be utilized to present recommendations 136, and/or to interact with the recommendation service 102. Typically, the user 122A interacts with the voice-controlled device 124A using speech that is captured by one or more microphones of the voice-controlled device 124.

The voice service 140, or some other component may process a corresponding audio signal associated with the audio data/voice command to determine words within the voice command (using automatic speech recognition techniques—ASR) and to determine an intent of the user (natural language processing techniques—NLU). Based on the identified words/intent, the voice service 140 and/or component can determine the recommendation(s) to generate, and output recommendations, which may be provided via the UI 132 and presented on a display and/or audibly via one or more speakers associated with a device, such as a voice-controlled device 124.

According to some configurations, the user 122A may select the different sources for the recommendation service 130 to access and utilize when generating the recommendations and performing actions. The sources may include many different types of sources. The data sources utilized by the recommendation system may include but are not limited to traffic sources, transportation schedule services, company shuttle service providers, work calendars, personal calendars, work to-do lists, personal to-do lists, custom data services (e.g., provided by the user's company), and the like.

In some examples, the recommendation system 102 uses different services that may be provided by a service provider associated with the voice-controlled device 124, or services provided by other entities. For instance, the recommendation system 102 may utilize a recommendation service 130, a voice service 140, a reminder/alarm service, a messaging service, a traffic service, a mapping service, a to-do list service, a calendar service, and the like (See FIG. 2 for more details).

Generally, the recommendation service 130 is configured to access the different data sources (e.g., services, websites, data stores, . . . ) selected by the user 122A, or some other authorized entity or user, and obtains data from the selected data sources that relate to generating the recommendation. According to examples, the user 122A authorizes ("opts-in") to allow one or more services, such as one or more of the location service(s) 120B to determine, utilize, and provide location data about the user. The user may allow some services access to location data and/or other data from other services and disallow other services to utilize location data and/or other data from other services. The user 122A may also authorize the recommendation service 130 to access and utilize data from the other services.

For example, the recommendation service 130 may generate a recommendation as when to leave. The recommendation may include a time to leave, a route to take home (or to work or a different location), the mode(s) of transportation to take home (e.g., car, bus, train, taxi, ferry, . . . ), and the like. In some examples, the recommendation service 130 analyzes the data to identify a time to leave based on the various data and constraints associated with the various data. For instance, if the user is taking public transportation then the predefined schedules affect the time to leave. The traffic at different times of the day may also be taken into consideration, along with meeting and/or other activities or tasks the user 122 may have that day.

As discussed above, the recommendation service 130 may automatically update a recommendation based on detected changes to the data. For example, if a traffic accident or road construction occurs on a road that was utilized in determining the time to leave, the recommendation service 130 may update the recommendation to take into account the change.

If the user asks the virtual assistant "Can I leave now?", and the current time is not the best time to leave, the recommendation service 130 may offer the user to be notified on the recommended time and/or the recommendation service 130 may determine and recommend an alternative time to leave. The recommendation service 130 may then utilize an alarm service, and/or some other component or service to configure the reminder for the user. In some configurations, the alarm or notification can be based on other tasks or actions that need to occur before the user 122 leaves. For example, if the recommendation of a time to leave is in the morning and the user is at home, the recommendation service 130 may notify the user 122A some determined period of time before the recommended time such that the user 122A can perform their morning routine.

In some examples, the recommendation service 130 provides notifications to other users that may include information about the user 122A leaving. In the example illustrated in FIG. 1, the user 122A has requested that user 122B be notified when they leave. When the user 122A leaves, the voice-controlled device 124B, or some other device may provide the notification 136B that the user 122A left. The notification 136B might also include other information such as an expected arrival time of the user. According to some configurations, the user 122A may also provide a personalized message to provide to one or more users. Further, in some examples, if an expected arrival time of the user 122A changes, another notification 136 may be provided to the user 122B. The notification 136B may be a voice message, a text message, an instant message, or some other type of notification.

According to some examples, the recommendation service 130 may utilize one or more machine learning mechanisms when generating the recommendations. In some configurations, information generated by the recommendation service 130, or some other component or device that is located remotely from the voice-controlled device 124, may be stored locally such that if the recommendation service 130 is not accessible for some period of time, the voice-controlled device 124 may access the information that may be processed locally by the voice-controlled device 124 or some other computing device. Additional details regarding the various components and processes described briefly above for interacting with a virtual assistant to coordinate, recommend and perform actions will be provided below with regard to FIGS. 2-9.

Figure 2:
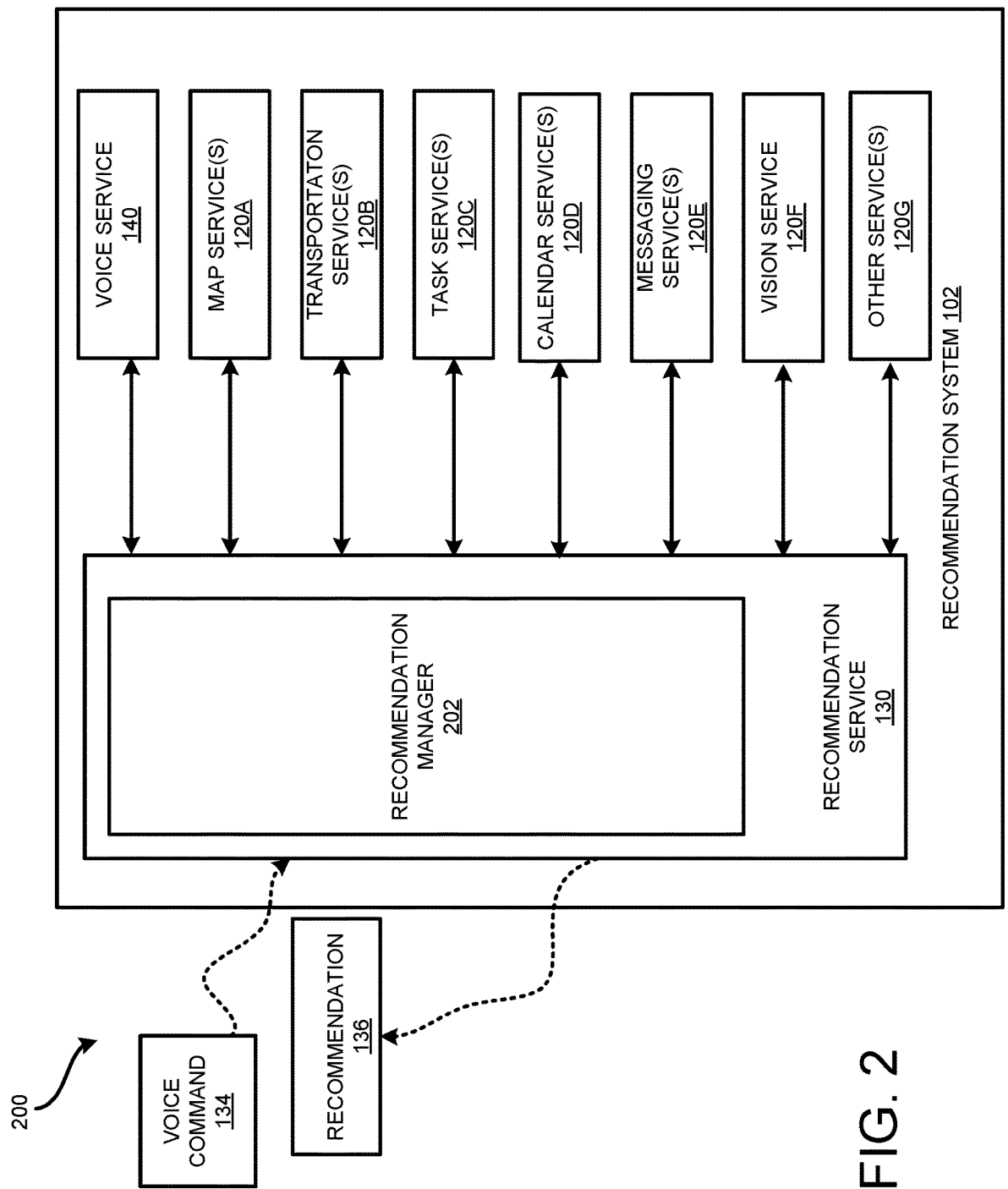
FIG. 2 is a software and network architecture diagram showing aspects of a recommendation system to generate recommendations using different services associated with a service provider.

FIG. 2 is a software and network architecture diagram showing aspects of a recommendation service 140 to generate recommendations using different services 120 associated with a service provider. It is to be appreciated that the environment 200 is merely illustrative and that the various configurations disclosed herein can be utilized in many different types of computing environments. FIG. 2 is similar to FIG. 1 but provides more details regarding the different services that can be utilized by the recommendation system 102.

As illustrated, recommendation system 102 includes voice service 140, map service(s) 120A, transportation service(s) 120B, task service(s) 120C, calendar service(s) 120D, messaging service(s) 120E, vision service 120F, and other services 120G. The recommendation service 130 may communicate with the services 120 using one or more Application Programming Interfaces (APIs) exposed by one or more of the services. In some examples, each service may expose one or more APIs that can be used by the recommendation service 130, or some other component, to access functionality and/or data provided by the service.

The voice service 140 may include a voice interface that may comprise one or more components configured to receive audio signals generated by the voice-controlled device 124 and perform ASR, NLU, and/or NLP techniques on the audio signals to identify user voice commands. After identifying a command from an audio signal, the speech interface may route the request to the appropriate domain. For instance, if a user issues a request for a recommendation of a time to go home, the speech interface may route the request to a "travel domain". If the user issues a request for a recommendation of when the best time is to run an errand, the speech interface may route the request to an "errand domain".

The map service(s) 120A are configured to provide a trip/route planner that finds routes between two or more given locations. For example, the recommendation manager 202 may request mapping data for one or more routes between work and home. The recommendation manager 202 may use the mapping service(s) 120A to search for routes using different criteria (e.g., fastest, shortest, fewest changes, cheapest, no toll roads, avoid certain roads, and the like). The searches may be constrained to leave or arrive at a certain time, to avoid certain waypoints, and the like. In some examples, the mapping service(s) may be utilized to search for public transportation options. For example, when public transportation operates according to published schedules.

Transportation service(s) 120B may provide data about schedules (e.g., bus schedules, work shuttles, and the like). In some examples, the transportation service(s) 120B may provide similar information to a mapping service 120A that include similar functionality. The recommendation manager 202 may obtain transportation data that may be used in determining the best time to leave. For example, the transportation data may indicate that the user 122A may leave on a shuttle at 5:00 PM that will arrive at the train station at 5:45 PM. The recommendation manager 202 may determine that a train leaves at 6:15 PM which will take the user to their car by 7:05 PM. This data may then be combined with mapping data, and other data (e.g., from calendar service(s) 120D, task service(s) 120C, . . . ) to determine an estimated arrival time.

The task service(s) 120C are configured to provide functionality for managing tasks. Generally, task management is the process of managing a task from creation to completion of the task. The task service(s) 120C are configured to assist users in completing tasks to achieve goals. Tasks may be simple (e.g., pick up water) to more complex (e.g., build a house). In some examples, the recommendation manager 202 may utilize task data obtained from the task service(s) 120C to determine tasks that a user still has to complete. The recommendation manager 202 may utilize data from the task service(s) 120C to determine a status of tasks, priority of tasks, time to complete tasks, and the like. In some cases, the recommendation manager 202 may determine that one or more tasks may be completed either before, during, or after the user 122A leaves.

The calendar service(s) 120D provide data about one or more calendars. For example, a calendar service 120D may provide data about work calendars, personal calendars, and other calendars associated with one or more users. In some examples, the recommendation manager 202 accesses one or more calendars of a user to identify times when the user is scheduled to be in a meeting and/or away from a location. For instance, when a user is at work and has asked "Can I leave now?", the recommendation manager 202 may request upcoming meetings that are scheduled in the work calendar for a user. The recommendations manager 202 may also request data about a personal calendar to determine any events scheduled for the user for that day.

The messaging service(s) 120E provide functionality for sending/receiving electronic messages. For example, the messaging service(s) 120E may be used by the recommendation manager 202 to send/receive Short Message Service (SMS) or Multimedia Messaging Service (MMS) messages, email messages, Instant Messages (IMs), and the like. As discussed above, the user 122A may configure the recommendation service 130 to provide one or more notifications. The notifications may relate to providing an electronic message to one or more other users about the user 122A leaving, an estimated time of arrival, and/or other information (e.g., a personalized message from the user 122A). In other configurations, an authorized user, such as user 122A, may authorize ("opts-in") the recommendation service 130 access to content of messages (e.g., emails, text messages, . . . ) of the user. According to this example, the recommendation service 130 may access the content of one or more messages to determine message content that indicates information associated with the user that may be utilized by the recommendation service 130.

The vision service 120F may include a vision interface to identify requests of the user made via user gestures and route the requests to the appropriate domain. In some examples, the vision service 120F may also be used to identify and authenticate a user. For example, the vision service 120F may use face recognition techniques to identify and authenticate the user.

Other service(s) 120G may provide other functionality not specifically discussed herein. For example, the other service(s) may include a location service to provide location data (e.g., where a particular user is located), functionality for obtaining a rental car, a driver, an errand service, and the like.

Figure 3:
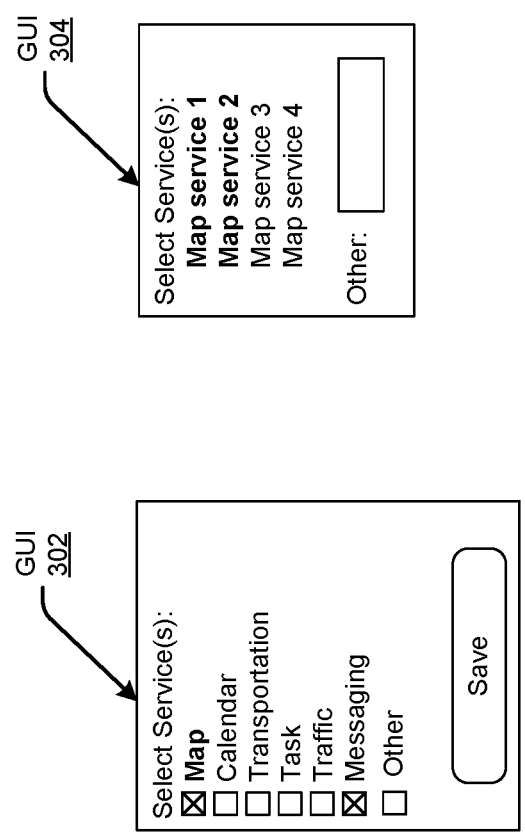
FIG. 3 is a diagram showing an illustrative graphical user interface for selecting services to utilize in the recommendation system.

FIG. 3 illustrates example graphical user interfaces 302 and 304 where the user 122A is able to select the services and/or data sources to utilize when generating the recommendations. In some instances, the recommendation service 130 may provide data for displaying the GUI 302 to a display associated with the voice-controlled device 124A.

As illustrated, the GUI 302 may list the available services and/or data sources from which the user may select from. In the illustrated example, the services include a map service, a calendar service, a transportation service, a task service, a traffic service, a messaging service, and other services. In some instances, the GUI 302, or some other GUI, may additionally or alternatively identify capabilities of services that may be utilized by the recommendation service 130.

In the example illustrated, GUI 302 includes checkboxes adjacent to each listed service to allow a user 122A to select the corresponding service. In addition, the GUI 304 includes a text box that allows a user to specify details for a service not listed. In the GUI 304, the user may select more than one map service to utilize. In the current example, the user has selected to use Map service 1 and Map service 2. Other UI elements can be utilized to select and/or specify the desired services. The example GUI 302 also includes a UI element for saving the configuration. Although the recommendation service 130 may allow the user to select different services, the recommendation service 130 may also select services on behalf of the user based on data to be used to provide a recommendation in response to a voice command/request provided by the user.

Figure 4:
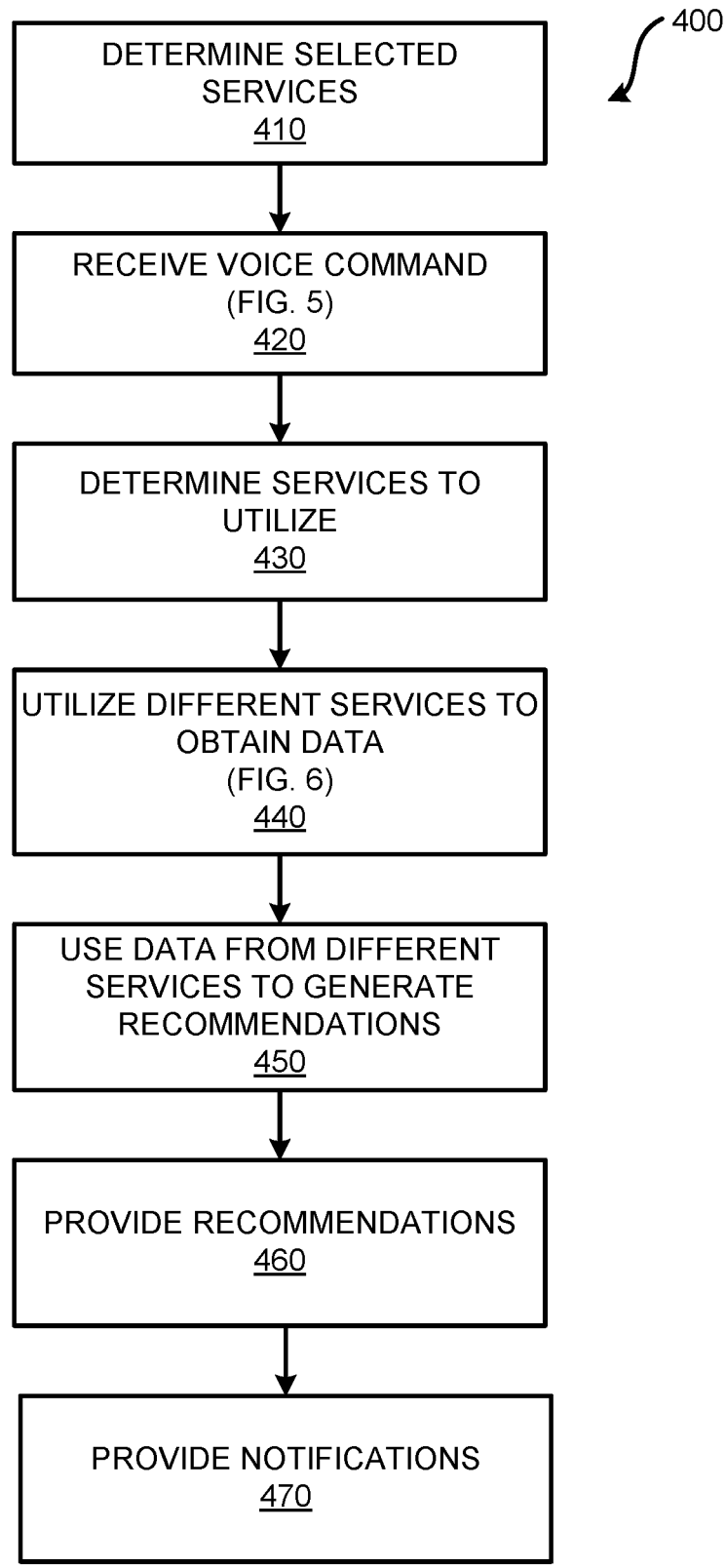
FIG. 4 is a flow diagram showing an illustrative routine for interacting with a virtual assistant to coordinate, recommend and perform actions.
Figure 5:
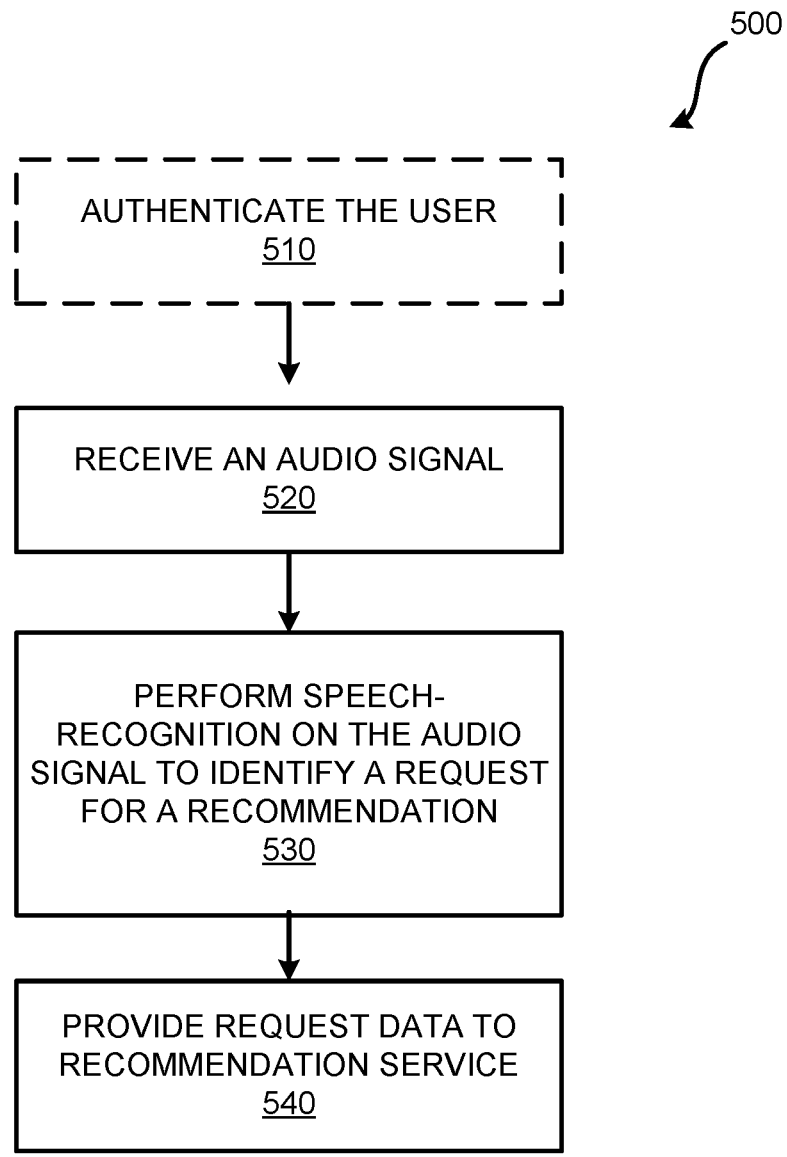
FIG. 5 is a flow diagram showing an illustrative routine for processing an auditory input associated with a virtual assistant.
Figure 6:
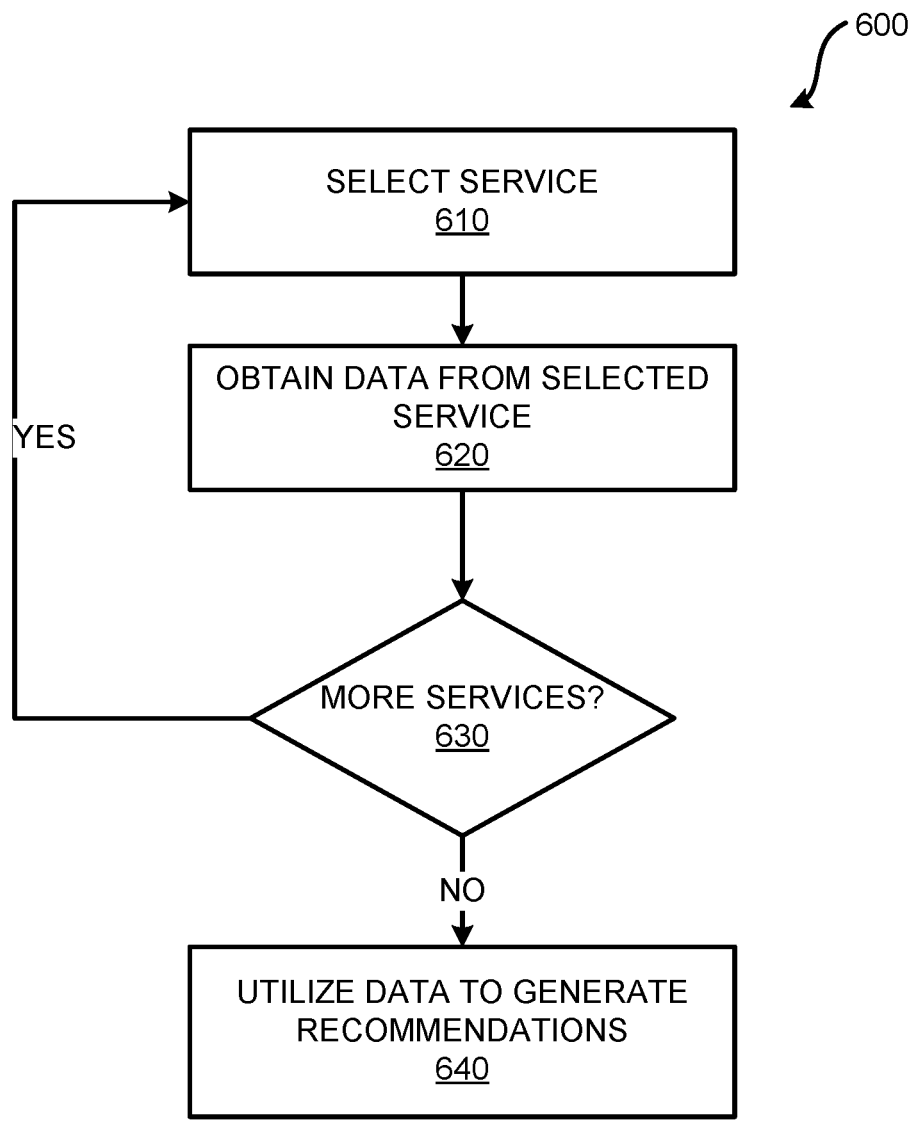
FIG. 6 is a flow diagram showing an illustrative routine for obtaining data from different selected services.

FIGS. 4-6 are flow diagrams showing illustrative routines 400, 500, and 600 for interacting with a virtual assistant to coordinate, recommend and perform actions, according to examples disclosed herein. It should be appreciated that the logical operations described herein with respect to FIG. 4, FIG. 5, FIG. 6, and the other FIGS., can be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations can be performed than shown in the FIGS. and described herein. These operations can also be performed in parallel, or in a different order than those described herein. Some or all of these operations can also be performed by components other than those specifically identified.

FIG. 4 is a flow diagram showing an illustrative routine 400 for interacting with a virtual assistant to coordinate, recommend and perform actions. At 410, the selected services are determined. As discussed above, the user 122, or some other authorized user or entity, may select the services to utilize to generate the recommendations. In some configurations, a GUI 302 is displayed that includes UI elements configured to receive the selections. For instance, the user 122 may select the services and specify any configuration data (if requested). In other examples, the user 122A may select the services using voice input.

At 420, the voice-controlled device 124, or some other input device, receives a voice command (or in some examples, a command entered using a different input mechanism). As discussed above, the voice command 134 includes one or more terms provided by a user 122 that are used by the recommendation service 130 to generate recommendations. For example, the voice-controlled device 124 may receive the voice command 134 using speech uttered by the user 122. In other examples, a web-based UI 132 can be provided for submitting a voice command 134 to the recommendation service 130. In other embodiments, the recommendation system 102 may cause a voice-controlled device 124 of the user 122 to audibly output audio data prompting the user 122 to provide the voice command 134. For instance, via one or more speakers of the voice-controlled device 124, the recommendation system 102 may cause the comp voice-controlled device 124 to audibly output, "Would you like me to generate a recommendation?" or something similar.

Typically, the voice command 134 is audibly uttered by the user 122, which is captured by one or more microphones of the voice-controlled device 124. In other embodiments, a request may be provided via one or more input components, such as a keyboard, a keypad, a display, etc. Regardless of how the voice command 134 is provided by the user 122, the voice-controlled device 124 and/or the recommendation system 102 may process the voice command 134, possibly using one or more speech recognition techniques (ASR) or one or more natural language processing techniques (NLU) in order to determine an intent associated with the voice command 134.

At 430, the services to utilize to generate the recommendation are determined. As discussed above, the recommendation service 130 may identify the services that are selected by the user 122. In other configurations, the recommendation service 130 may utilize a default set of services when generating the recommendations. In yet other examples, the recommendation service 130 may select a portion of the selected services depending on the requested recommendation.

At 440, the recommendation service 130 utilizes the determined services to obtain data used to generate the recommendations. For example, the recommendation service may receive weather data for the locations associated with the starting point, ending point, as well as the points between. The recommendation service 130 may also obtain current scheduling data from one or more scheduling services, routing data from one or more mapping services, as well as data from other sources and/or services. See FIG. 6 and related discussion for more details.

At 450, the recommendation service 130 generates the recommendations using the data obtained from the services. As discussed above, the recommendation service 130 may process the data to determine the recommendations. In some configurations, the recommendation service 130 utilizes one or more machine learning mechanisms to process at least a portion of the data. For instance, the recommendation service 130 may utilize the data obtained from the mapping service, a weather service, traffic service, scheduling service and the like to generate a recommendation for a time to leave. In some examples, the recommendation service 130 analyzes the obtained data to determine a recommendation of a time to leave that attempts to maximize a productivity time of the user 122. For example, the recommendation service 130 may analyze the different options to determine a minimum amount of travel time. In other examples, some other criteria may be utilized. In other configurations, the recommendations service 130 may utilize other services, components, or mechanisms to generate the recommendations.

At 460, the recommendations are provided to the user. As discussed above, the recommendations 136 can be presented within a UI, such as the UI 132, provided via voice output using the voice-controlled computing device 124, or using some other mechanism. For instance, the recommendation 136 may be audibly output via one or more speakers of the computing device 124A of the user 122A. In some examples, the user 122A can utilize the UI 132 to obtain more information. For instance, the user 122A may view the recommended route, recommended method of transport, and make changes (e.g., change the method of transportation, select a different route, and the like). The user 122A may also configure who to notify, as well as what to include in the notification. The user 122A may also interact with the voice-controlled device 124 using speech that is captured by one or more microphones of the computing device 124. Responsive thereto, the recommendation service can provide additional information.

At 470, any configured notifications are provided. As discussed above, the user 122A may specify to provide a message to one or more users. For example, the user 122A may specify to send a message to a family member and/or friend when they leave, possibly along with other information such as a personal message recorded by the user 122. In some examples, the recommendation service 130 may also configure additional messages to be provided to the users, such as user 122B, based on events that may occur. For example, if the user 122A is delayed by unexpected traffic, the recommendation service 130 may send another notification indicating that the user is running late along with a new arrival time. In these examples, the recommendation service may monitor the progress of the user 122 along the route.

FIG. 5 is a flow diagram showing an illustrative routine 500 for processing an auditory input associated with a virtual assistant, according to examples disclosed herein. The routine 500 begins at 510, where the user 122A may be authenticated. As discussed above, the authentication may involve different procedures. In some configurations, the user 122A can be requested to provide information that is used to verify the identity of the user. In other configurations, the authentication may involve other techniques. For instance, determining that the voice-controlled device 124 transmitting the voice command 134 is an authorized device. In some examples, the user 122A may have previously been authenticated, and this operation may be bypassed.

At 520, an audio signal generated within the environment is received. As discussed above, the audio signal may be generated by a voice-controlled device 124 and/or by some other input device. The audio signal may include a voice command 134 of a user requesting to receive a recommendation and/or perform some other action relating to providing recommendations.

At 530, speech-recognition on the audio signal is performed to identify the voice command 134 of the user. As discussed above, the voice service 140 may determine whether the audio signal includes a voice command for a recommendation and/or the audio signal includes additional information or requests.

At 540, data associated with the request is provided to the recommendation service 130. For example, the voice service 140 may provide data to the recommendation service 130 indicating that the user 122 has requested a recommendation for a time to leave, along with a request to use a specific mode of transportation and to notify two people when the user leaves and/or reaches some particular location on the route to the destination.

FIG. 6 is a flow diagram showing an illustrative routine for obtaining data from different selected services, according to examples disclosed herein. At 610, service is selected. As discussed above, the user 122 may select the services to utilize using a user interface, or some other input mechanism, such as voice.

At 620, the recommendation service 130 contacts the selected service from which to obtain data. For example, the recommendation service 130 may contact a map service 120A to obtain route information for travel, a transportation service 120B to obtain scheduling data for one or more types of travel (e.g., work bus, public bus, train, . . . ), a task service 120C to obtain tasks for the user, a calendar service 120D to obtain data about upcoming appointments for the user 122, and the like.

At 630, a determination is made as to whether there are any more services that have not been accessed yet. When there are more selected services to access, the process returns to 610. When there not any more services to access, the process flows to 640, where the obtained data from the selected services may be utilized by the recommendation service 130 to generate the recommendations.

Figure 7:
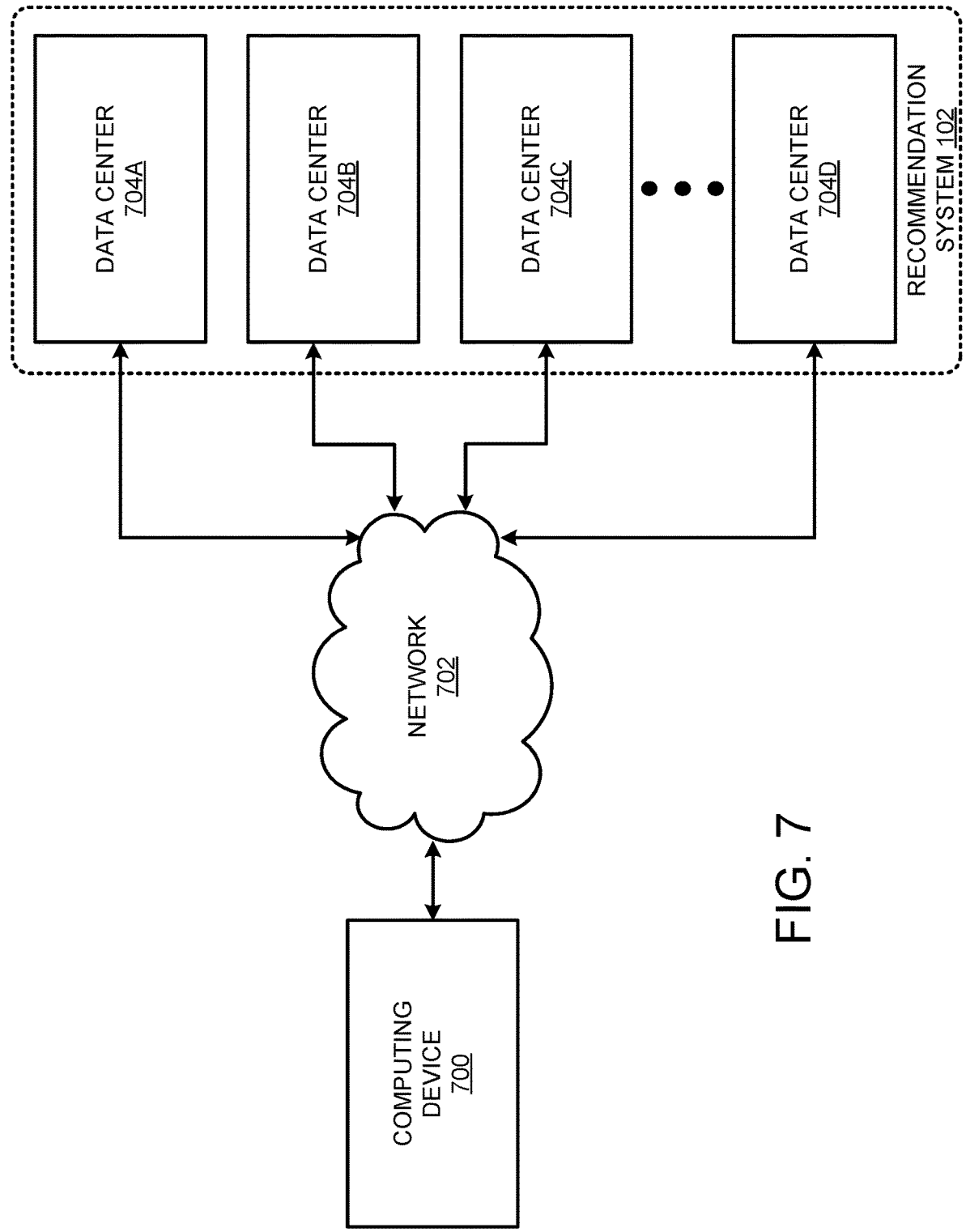
FIG. 7 is a system and network diagram that shows an illustrative operating environment including several data centers that can be configured to implement aspects of the functionality described herein.

FIG. 7 is a system and network diagram that shows one illustrative operating environment for the configurations disclosed herein that includes a recommendation system 102 that can be configured to provide the functionality described above. As discussed above, the recommendation system 102 can execute network services that provide computing resources for implementing the functionality disclosed herein. The computing resources implemented by the recommendation system 102 can be data processing resources, such as virtual machine ("VM") instances, data storage resources, networking resources, data communication resources, network services, and other types of resources.

The computing resources utilized can be general-purpose or can be available in a number of specific configurations. For example, data processing resources can be available as physical computers or VM instances in a number of different configurations. The VM instances can be configured to execute applications, including web servers, servers, media servers, database servers, some or all of the network services described above, and/or other types of programs. Data storage resources can include file storage devices, block storage devices, and the like. The recommendation system 102 can also include and utilize other types of computing resources not mentioned specifically herein.

As also discussed above, the computing resources provided by the recommendation system 102 are enabled in one implementation by one or more data centers 704A-704D (which might be referred to herein singularly as "a data center 704" or collectively as "the data centers 704"). The data centers 704 are facilities utilized to house and operate computer systems and associated components. The data centers 704 typically include redundant and backup power, communications, cooling, and security systems. The data centers 704 can also be located in geographically disparate locations. One illustrative configuration for a data center 704 that can be utilized to implement the technologies disclosed herein will be described below with regard to FIG. 8.

The users can access the services provided by the recommendation system 102 over a network 702, which can be a wide area communication network ("WAN"), such as the Internet, an intranet or an Internet service provider ("ISP") network or a combination of such networks. For example, and without limitation, a computing device 700 operated by a user or other user of the recommendation system 102, such as the computing device 124, can be utilized to access the recommendation system 102 by way of the network 702. It should be appreciated that a local-area network ("LAN"), the Internet, or any other networking topology known in the art that connects the data centers 704 to remote users and other users can be utilized. It should also be appreciated that combinations of such networks can also be utilized.

Figure 8:
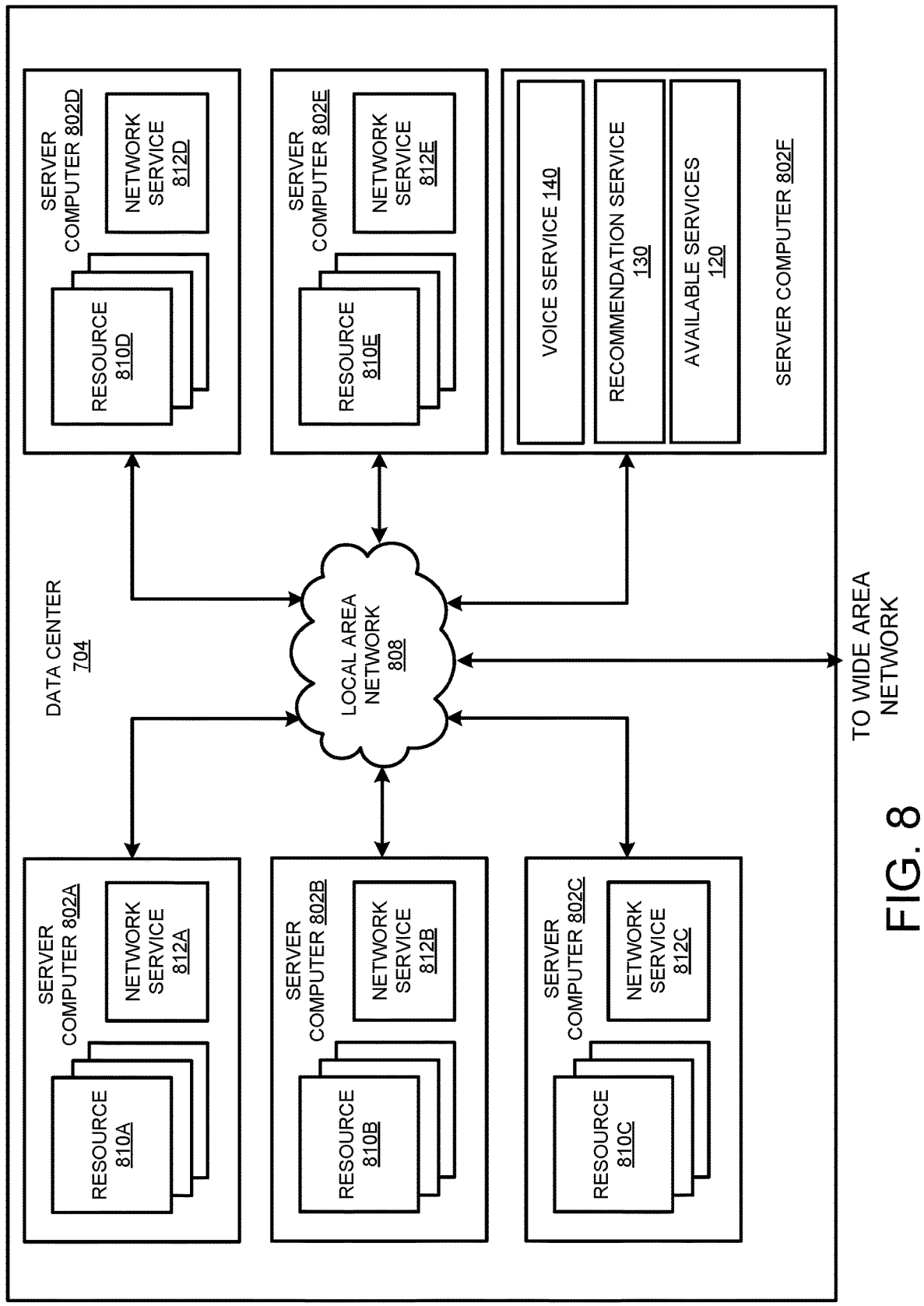
FIG. 8 is a computing system diagram illustrating a configuration for a data center that can be utilized to implement aspects of the technologies disclosed herein.

FIG. 8 is a computing system diagram that illustrates examples for a data center 704 that can be utilized to implement the recommendation service 130, the voice service 140, other services 120, and the other functionality disclosed herein. The example data center 704 shown in FIG. 8 includes several server computers 802A-802F (which might be referred to herein singularly as "a server computer 802" or in the plural as "the server computers 802").

The server computers 802 can be standard tower, rack-mount, or blade server computers configured appropriately for providing various types of computing resources 810 for implementing the functionality disclosed herein. As mentioned above, the computing resources 810 provided by the data center 704 can be data processing resources such as VM instances or hardware computing systems, data storage resources, database resources, networking resources, and others. Some of the servers 802 can also be configured to execute network services 812A-812-E, respectively, capable of instantiating, providing and/or managing the computing resources 810A-810E.

The data center 704 shown in FIG. 8 also includes a server computer 802F that can execute some or all of the software components described above. For example, and without limitation, the server computer 802F can be configured to execute the recommendation services 130, and the other services, which have been described in detail above. The server computer 802F can also be configured to execute other components and/or to store data for providing some or all of the functionality described herein. In this regard, it should be appreciated that components or different instances of the services can execute on many other physical or virtual servers in the data centers 704 in various configurations.

In the example data center 704 shown in FIG. 8, an appropriate LAN 808 is also utilized to interconnect the server computers 802A-802F. The LAN 808 is also connected to the network 702 illustrated in FIG. 7. It should be appreciated that the configuration of the network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 704A-704D, between each of the server computers 802A-802F in each data center 704, and, potentially, between computing resources 810 in each of the data centers 704. It should be appreciated that the configuration of the data center 704 described with reference to FIG. 8 is merely illustrative and that other implementations can be utilized.

Figure 9:
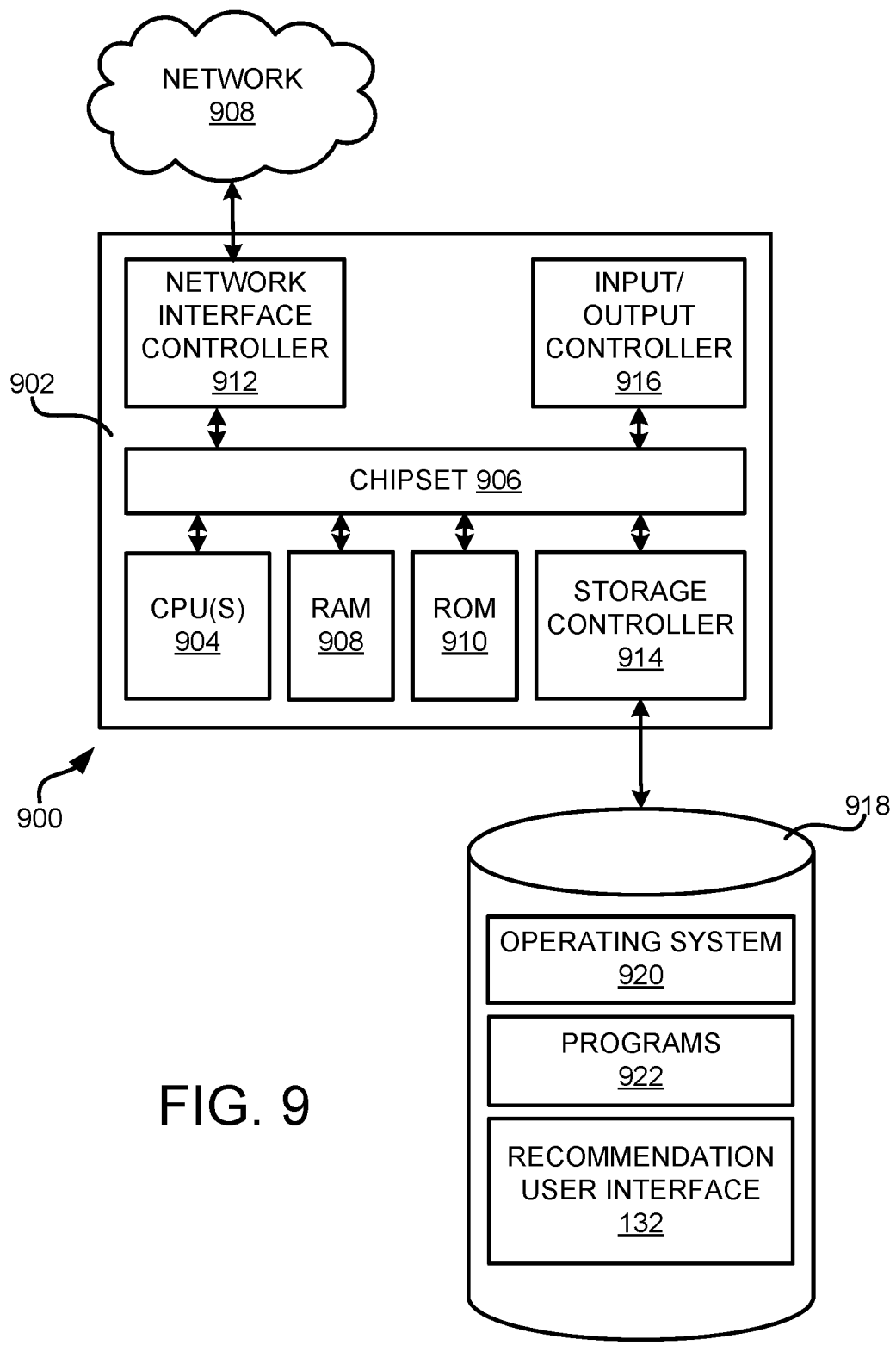
FIG. 9 is a computer architecture diagram showing an illustrative computer hardware architecture for implementing a computing device that can be utilized to implement aspects of the various technologies presented herein.

FIG. 9 shows an example computer architecture for a computer 900 capable of executing program components for implementing the functionality described above. The computer architecture shown in FIG. 9 illustrates a conventional server computer, workstation, desktop computer, laptop, tablet, network appliance, e-reader, smartphone, or other computing device, and can be utilized to execute any of the software components presented herein.

The computer 900 includes a baseboard 902, or "motherboard," which is a printed circuit board to which a multitude of components or devices can be connected by way of a system bus or other electrical communication paths. In one illustrative configuration, one or more central processing units ("CPUs") 904 operate in conjunction with a chipset 906. The CPUs 904 can be standard programmable processors that perform arithmetic and logical operations necessary for the operation of the computer 900.

The CPUs 904 perform operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 906 provides an interface between the CPUs 904 and the remainder of the components and devices on the baseboard 902. The chipset 906 can provide an interface to a RAM 908, used as the main memory in the computer 900. The chipset 906 can further provide an interface to a computer-readable storage medium such as a read-only memory ("ROM") 910 or non-volatile RAM ("NVRAM") for storing basic routines that help to startup the computer 900 and to transfer information between the various components and devices. The ROM 910 or NVRAM can also store other software components necessary for the operation of the computer 900 in accordance with the configurations described herein.

The computer 900 can operate in a networked environment using logical connections to remote computing devices and computer systems through a network, such as the network 908. The chipset 906 can include functionality for providing network connectivity through a NIC 912, such as a gigabit Ethernet adapter. The NIC 912 is capable of connecting the computer 900 to other computing devices over the network 908. It should be appreciated that multiple NICs 912 can be present in the computer 900, connecting the computer to other types of networks and remote computer systems.

The computer 900 can be connected to a mass storage device 918 that provides non-volatile storage for the computer. The mass storage device 918 can store an operating system 920, programs 922, user interface 132, and data, which have been described in greater detail herein. The mass storage device 918 can be connected to the computer 900 through a storage controller 914 connected to the chipset 906. The mass storage device 918 can consist of one or more physical storage units. The storage controller 914 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 900 can store data on the mass storage device 918 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 918 is characterized as primary or secondary storage, and the like.

For example, the computer 900 can store information to the mass storage device 918 by issuing instructions through the storage controller 914 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 900 can further read information from the mass storage device 918 by detecting the physical states or characteristics of one or more particular locations within the physical storage units.

In addition to the mass storage device 918 described above, the computer 900 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 900.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 918 can store an operating system 920 utilized to control the operation of the computer 900. According to examples, the operating system comprises the LINUX operating system or one of its variants. According to another configuration, the operating system comprises the WINDOWS® SERVER operating system from MICROSOFT Corporation. According to further configurations, the operating system can comprise the UNIX operating system or one of its variants. It should be appreciated that other operating systems can also be utilized. The mass storage device 918 can store other system or application programs and data utilized by the computer 900.

In examples, the mass storage device 918 or other computer-readable storage media is encoded with computer-executable instructions which, when loaded into the computer 900, transform the computer from a general-purpose computing system into a special-purpose computer capable of implementing the configurations described herein. These computer-executable instructions transform the computer 900 by specifying how the CPUs 904 transition between states, as described above. According to examples, the computer 900 has access to computer-readable storage media storing computer-executable instructions which, when executed by the computer 900, perform the various processes described above with regard to FIGS. 1-8. The computer 900 can also include computer-readable storage media for performing any of the other computer-implemented operations described herein.

The computer 900 can also include one or more input/output controllers 916 for receiving and processing input from a number of input devices, such as a keyboard, a mouse, a touchpad, a touch screen, an electronic stylus, or other type of input device. Similarly, an input/output controller 916 can provide output to a display, such as a computer monitor, a flat-panel display, a digital projector, a printer, or other type of output device. It will be appreciated that the computer 900 might not include all of the components shown in FIG. 9, can include other components that are not explicitly shown in FIG. 9, or can utilize an architecture completely different than that shown in FIG. 9.

Based on the foregoing, it should be appreciated that technologies for interacting with a virtual assistant to coordinate, recommend and perform actions have been disclosed herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the following claims.

What is claimed is:

1. A system, comprising:
one or more processors; and
a non-transitory computer-readable storage medium having instructions stored thereupon which, when executed by the one or more processors, cause the system to:
perform natural language understanding techniques on an audio signal associated with speech uttered by a user and that was captured by one or more microphones of a voice-controlled device to identify a voice command requesting a recommendation for a time to leave a first location to perform one or more actions;
identify services from which to obtain data based, at least in part, on one or more selections of services by the user, wherein the services include a mapping service that maintains mapping data and a calendar service that maintains calendar data associated with the user;
obtain the data from the services, wherein the data includes one or more travel times from the first location to a second location and at least a portion of the calendar data;
determine, based at least in part on the data, one or more first time periods available for the user to perform the one or more actions that are nonconflicting with one or more second time periods available for the user to perform one or more other actions;
generate the recommendation based, at least in part, on the one or more first time periods and the one or more second time periods, wherein the recommendation indicates the time to leave within the one or more first time periods such that a productivity time to perform the one or more other actions within the one or more second time periods for the user is increased, and
cause the recommendation to be audibly output to the user.

2. The system of claim 1, wherein obtaining the data from the services comprises:
- obtaining the mapping data from the mapping service, wherein the mapping data is associated with travel between the first location and the second location; and
- obtaining the calendar data from the calendar service, wherein the calendar data is obtained from one or more calendars of the user and includes meeting data indicating scheduled events for the user for at least a portion of a day associated with the time to leave the first location.

3. The system of claim 1, wherein the instructions further cause the system to transmit a notification to a second user indicating at least one of an actual time the user left the first location or an expected arrival time for the user at the second location.

4. The system of claim 1, wherein the instructions further cause the system to:
- configure an alarm based, at least in part, on the time to leave; and
- cause a notification to be provided to a computing device associated with the user at a time of the alarm.

5. The system of claim 1, wherein the instructions further cause the system to determine that at least a portion of the data used to generate the recommendation has been updated, and generate an updated recommendation using the at least the portion of the data that has been updated.

6. A computer-implemented method comprising:
- determining, by at least one of a voice-controlled device associated with a user or one or more devices remote from the voice-controlled device, an audio signal;
- processing the audio signal to identify a voice command requesting a recommendation for a time to perform an action;
- accessing data from one or more services to utilize in generating the recommendation, wherein the one or more services include one or more of a mapping service that maintains mapping data, a calendar service that maintains calendar data associated with the user, or a task service that maintains task data associated with the user;
- determining, based at least in part on the data, one or more first time periods available for the user to perform the action that are nonconflicting with one or more second time periods available for the user to perform one or more other actions;
- generating the recommendation based, at least in part, on the one or more first time periods, wherein the recommendation indicates a time to perform the action; and
- causing the recommendation to be provided to the user via one or more of the voice-controlled device or another computing device.

7. The computer-implemented method of claim 6, further comprising identifying the one or more services based, at least in part, on one or more selections from a plurality of available services by the user.

8. The computer-implemented method of claim 6, wherein accessing the data from the one or more services comprises:
- obtaining the mapping data, wherein the mapping data is associated with travel between a first location and a second location; and
- obtaining the calendar data from the calendar service, wherein the calendar data is obtained from one or more calendars of the user and includes meeting data indicating scheduled events for the user for at least a portion of a day associated with the time to perform the action.

9. The computer-implemented method of claim 6, further comprising transmitting a notification to a second user indicating at least one of an actual time the user left a first location or an expected arrival time for the user at a second location.

10. The computer-implemented method of claim 9, wherein transmitting the notification to the second user comprises causing an electronic message to be transmitted to the second user upon determining that the user has left the first location.

11. The computer-implemented method of claim 9, further comprising sending a second notification to the second user based at least in part on determining that the expected arrival time has changed.

12. The computer-implemented method of claim 6, further comprising:
- determining that the data changed after generating the recommendation;
- obtaining at least a portion of the data that changed from one or more of the services; and
- updating the recommendation based, at least in part, on the at least the portion of the data.

13. The computer-implemented method of claim 6, wherein the time to perform the action is a time to leave a first location to travel to a second location, and wherein generating the recommendation comprises determining one or more other actions to perform, wherein the one or more other actions include determining to perform one or more tasks during the travel.

14. The computer-implemented method of claim 6, further comprising:
- configuring an alarm based, at least in part, on the time to perform the action; and
- causing a notification to be provided to a computing device associated with the user at a time of the alarm.

15. The computer-implemented method of claim 6, wherein generating the recommendation comprises determining the time to perform the action such that an amount of productivity time for the user is increased.

16. The method of claim 6, wherein the action is associated with travel of the user from a first location to a second location, and wherein generating the recommendation is performed without an indication of a desired arrival time at the second location.

17. A system, comprising:
- one or more processors; and
- a non-transitory computer-readable storage medium having instructions stored thereupon which, when executed by the one or more processors, cause the system to perform actions comprising:
  - determining, by at least one of a voice-controlled device associated with a user or one or more devices remote from the voice-controlled device, an audio signal;
  - processing the audio signal to identify a voice command requesting a recommendation associated with performance of an action;
  - accessing data provided by one or more services to utilize in generating the recommendation;
  - determining, based at least in part on the data, one or more first time periods available for the user to perform the action that are nonconflicting with one or more second time periods available for the user to perform one or more other actions;

generating the recommendation based, at least in part, on the one or more first time periods, wherein the recommendation indicates a time to perform the action; and causing the recommendation to be provided to the user via the voice-controlled device or a different computing device.

18. The system of claim 17, wherein accessing the data from the one or more services comprises:

obtaining mapping data, wherein the mapping data is associated with the travel between a first location and a second location; and obtaining calendar data from a calendar service, wherein the calendar data is obtained from one or more calendars of the user and includes meeting data indicating scheduled events for the user for at least a portion of a day associated with the time to leave.

19. The system of claim 17, the actions further comprising transmitting a notification to a second user indicating at least one of an actual time the user left a first location or an expected arrival time at a second location, wherein transmitting the notification to the second user comprises causing an electronic message to be transmitted to the second user upon determining that the first user left the first location.

20. The system of claim 17, the actions further comprising:

determining that the data changed after generating the recommendation;

obtaining at least a portion of the data that changed from one or more of the services; and updating the recommendation based, at least in part, on the at least the portion of the data.

* * * * *